Patented Oct. 8, 1935

2,016,381

UNITED STATES PATENT OFFICE 2,016,381

METHOD OF COATING GLASSWARE

James E. McBurney, Alton, Ill., assignor to Owens-Illinois Glass Company, a corporation of Ohio No Drawing. Application May 4, 1932, Serial No. 609,267

4 Claims. (Cl. 49—77)

My invention relates to a method of applying a temporary coating comprising sulphur or a sulphur compound to glass articles, which coating serves as a protection against scratching or marring during the handling of the articles after they leave the annealing leer.

In the manufacture of glassware such as bottles, jars or other molded articles, the ware when discharged from the molds is at a rather high temperature, usually a dull red heat or approximating a red heat, and is ordinarily transferred to the annealing leer before the temperature is greatly reduced. The ware is retained at a high temperature in the leer for a considerable period of time, usually several hours, and is gradually cooled before leaving the leer.

Glass annealing chambers or leers are heated by various methods. In the open fired type of leer, fuel gas or oil is burned directly in the annealing chamber. This results in a smoky film or coating containing sulphur being deposited on the ware. This coating is of utility, particularly as it forms a protection for the ware, preventing scratching and marring during handling of the ware after it leaves the leer. This coating is only temporary and can readily be removed by washing.

In other types of leers, such as electric leers and muffle leers, the fuel gases are not burned in the annealing chamber, so that there is no deposit on the annealed ware such as above mentioned. Attempts have been made to coat glassware during the process of annealing in types of leers other than the open fired leer, by burning sulphur or sulphur compounds within the leer during the annealing process. Such attempts have not met with much success, particularly as such method is not adapted for giving uniform results or for evenly coating ware. Moreover, the sulphur fumes within the leer are objectionable on account of their corroding action on the leer mechanism and other objects with which they come in contact. An object of the present invention is to provide a satisfactory method of coating the ware, adapted for use with any type of leer or system of heating the ware in the leer, and without introducing corrosive fumes into the leer chamber.

I have discovered that a coating such as above referred to can be applied to the ware by the use of a sulphur compound in the manner hereinafter set forth. An object of my invention is to provide a novel method of applying to the ware a uniform coating comprising sulphur or a sulphur compound, by the use, for example, of sodium sulphate applied to the ware in such manner that the resulting sulphur coating may be regulated and controlled. This method is more reliable and effective than the smoking process incidental to the process of annealing in an open fired leer and, moreover, is adapted for use with any type of leer or system of tempering the ware in the leer.

Other objects of the invention will appear hereinafter.

In practicing my invention, I employ an aqueous solution of a sulphur compound such as sodium sulphate or potassium sulphate. Sodium sulphate has been found to give very satisfactory results. The sulphate solution is preferably warmed or heated to a moderately high temperature. It is then sprayed on the glass articles in the form of a very fine spray or mist. This spray is applied to the articles during the brief interval between the time they are discharged from the forming molds and their entrance into the leer, the articles being at this time at a high temperature, usually somewhat below a red heat. The spray when it strikes the articles is sublimated, leaving a thin white, unctuous coating of sulphate which adheres to the article and serves as a lubricant, preventing scratching or marring when the surfaces of the articles come in contact or rub against each other. A coating of this kind is particularly desirable for various kinds of bottles, for example, beverage bottles, although its use is not limited to this line of ware.

Modifications may be resorted to within the spirit and scope of my invention.

What I claim is:

1. The method of applying a sulphur coating to the surface of a molded glass article which comprises spraying the surface of the article after it is discharged from the mold and while at a high temperature, with a spray consisting of an aqueous solution of sodium sulphate, causing said compound to sublimate when it comes in contact with the hot surface of the article, and then annealing the article.

2. The method of applying a coating of sulphur to the surface of a glass article, which comprises spraying said surface with sodium sulphate in a finely divided state while said surface is hot, and causing sublimation of the coating material while in contact with the hot glass.

3. The method of coating the surface of a glass article, which comprises spraying said surface while the glass is hot, with a warm aqueous solution of sodium sulphate, and causing sublimation of the coating material by contact with the hot glass.

4. The method of applying to the surface of a glass article a coating of sulphur removable from the article by washing, which comprises spraying said surface with an aqueous solution containing a sulphur compound which will be sublimated by the heat of the glass while the latter is below a red heat, said spraying being effected while said surface is at a sufficiently high temperature to cause sublimation of said compound and at a low enough temperature to prevent substantial chemical reaction between said compound and the glass, and thereby causing sublimation of said compound and deposit of a coating of sulphur on said surface.

JAMES E. McBURNEY.